United States Patent
Goldmann et al.

(10) Patent No.: US 10,929,117 B2
(45) Date of Patent: Feb. 23, 2021

(54) CONTAINER IMAGE BUILDING USING SHARED RESOURCES

(71) Applicant: Red Hat, Inc., Raleigh, NC (US)

(72) Inventors: Marek Goldmann, Warsaw (PL); David Becvarik, Brno (CZ)

(73) Assignee: Red Hat, Inc., Raleigh, NC (US)

(*) Notice: Subject to any disclaimer, the term of this patent is extended or adjusted under 35 U.S.C. 154(b) by 0 days.

(21) Appl. No.: 15/892,193

(22) Filed: Feb. 8, 2018

(65) Prior Publication Data
US 2019/0243628 A1 Aug. 8, 2019

(51) Int. Cl.
| G06F 8/61 | (2018.01) |
| H04L 29/08 | (2006.01) |
| G06F 16/188 | (2019.01) |
| G06F 9/00 | (2006.01) |

(52) U.S. Cl.
CPC .............. *G06F 8/63* (2013.01); *G06F 9/00* (2013.01); *G06F 16/188* (2019.01); *H04L 67/34* (2013.01); *H04L 67/06* (2013.01); *H04L 67/10* (2013.01)

(58) Field of Classification Search
None
See application file for complete search history.

(56) References Cited

U.S. PATENT DOCUMENTS

| 9,355,248 | B1* | 5/2016 | Wiest | G06F 9/45558 |
| 9,396,251 | B1 | 6/2016 | Bondreau et al. | |
| 2017/0116334 | A1* | 4/2017 | Kruglikov | G06F 16/21 |
| 2017/0177860 | A1 | 6/2017 | Suarez et al. | |
| 2017/0177877 | A1* | 6/2017 | Suarez | G06F 16/188 |
| 2017/0249128 | A1* | 8/2017 | Fojtik | G06F 8/71 |
| 2017/0257432 | A1* | 9/2017 | Fu | G06F 9/5072 |
| 2017/0300697 | A1* | 10/2017 | Iyer | G06F 21/57 |
| 2017/0373940 | A1* | 12/2017 | Shahab | H04L 47/70 |
| 2018/0137139 | A1* | 5/2018 | Bangalore | H04L 67/2842 |
| 2018/0189296 | A1* | 7/2018 | Ashour | G06F 16/44 |
| 2019/0004865 | A1* | 1/2019 | Ivanov | G06F 9/5038 |
| 2019/0114164 | A1* | 4/2019 | Wong | G06F 8/658 |

FOREIGN PATENT DOCUMENTS

| CN | 105224466 A | 1/2016 |
| CN | 105429813 A | 3/2016 |
| WO | 2017162058 A1 | 9/2017 |

OTHER PUBLICATIONS

"Beginner's guide to use docker (Build, Run, Push and Pull)", Internet article, Deepak Shakya, Apr. 5, 2017 (Year: 2017).*

(Continued)

*Primary Examiner* — Daxin Wu
(74) *Attorney, Agent, or Firm* — Withrow & Terranova, PLLC

(57) ABSTRACT

Container image building using shared resources is disclosed. A first instruction file that contains a first plurality of instruction keywords is read. Based on the first plurality of instruction keywords, a first plurality of files from a shared location is copied to a first consolidated location. Based on the first plurality of instruction keywords, a first container command file that references at least some of the first plurality of files on the first consolidated location is generated, the first container command file including commands that comply with a container builder syntax.

14 Claims, 12 Drawing Sheets

(56) References Cited

OTHER PUBLICATIONS

"The Docker Ecosystem: An Overview of Containerization", internet article, Justin Ellingwood, Feb. 1, 2015 (Year: 2015).*
MS computer dictionary), Microsoft online computer dictionary, 2002 (Year: 2002).*
"Building the IBM Containers cloud service", Arnold et al., IBM J. Res. & Dev. vol. 60 No. 2/3 Paper 9 Mar./May 2016 (Year: 2016).*
Author Unknown, "Top Docker Tools: 51 Useful Docker Tools for Every Stage of the Development Pipeline," Stackify, Oct. 17, 2017, 41 pages, https://stackify.com/top-docker-tools/.
Ustyuzhanin, A. et al., "Everware toolkit. Supporting reproducible science and challenge-driven education," Journal of Physics: Conference Series, vol. 898, Track 5: Software Development, Mar. 3, 2017, 8 pages.

* cited by examiner

```
76 ┌─────────────────────────────────────────┐
   │              MODULE.YAML                │
   │ SCHEMA_VERSION: 1                       │
   │                                         │
   │ NAME: JDK8                              │   ⎫
   │                                         │   │
   │ VERSION: 1.0                            │   │
   │                                         │   ⎬ JDK8 MODULE
   │ DESCRIPTION: MODULE INSTALLING OPENJDK 8│   │
   │                                         │   │
78-1 │ ENVS:                                 │   │
   │   - NAME: "JAVA_HOME"                   │   │
   │     VALUE: "/USR/LIB/JVM/JAVA-1.8.0-OPENJDK" │
   │                                         │   │
78-2 │ PACKAGES:                             │   │
   │   INSTALL:                              │   │
   │     - JAVA-1.8.0-OPENJDK-DEVEL          │   │
   └─────────────────────────────────────────┘
```

```
84 ┌─────────────────────────────────────────┐
   │              CREATE.SH                  │
   │ #!/BIN/SH                               │
88-1 │ SET -E                                │
88-2 │ GROUPADD -R USER -G 1000 && USERADD -U│
   │ 1000 -R -G USER -M -D /HOME/USER -S /SBIN/ │
   │ NOLOGIN -C "REGULAR USER" USER          │
   └─────────────────────────────────────────┘

82 ┌─────────────────────────────────────────┐
   │              MODULE.YAML                │
   │ SCHEMA_VERSION: 1                       │   ⎫
   │                                         │   │
   │ NAME: USER                              │   │
   │                                         │   │
   │ VERSION: 1.0                            │   │
   │                                         │   ⎬ USER MODULE
   │ DESCRIPTION: "CREATES A REGULAR USER    │   │
   │ THAT COULD BE USED TO RUN ANY SERVICE,  │   │
   │ GUI/UID: 1000"                          │   │
86-1 │ EXECUTE:                              │   │
   │   - SCRIPT: CREATE.SH                   │   │
86-2 │ RUN:                                  │   │
   │   USER: 1000                            │   │
   │   WORKDIR: "/HOME/USER"                 │   │
   └─────────────────────────────────────────┘
```

FIG. 3B

```
94 ─┐  INSTALL.SH
     #!/BIN/SH 100-1 ─ SET -E 100-2 ─ TAR -C /HOME/USER -XF /TMP/ARTIFACTS/
        TOMCAT.TAR.GZ 100-3 ─ CHOWN USER:USER -R /HOME/USER
```

```
92 ─┐  MODULE.YAML
     SCHEMA_VERSION: 1

NAME: TOMCAT
     VERSION: 1.0
     DESCRIPTION: "MODULE USED TO INSTALL
     TOMCAT 8"

# DEFINED ARTIFACTS THAT ARE USED TO
     # BUILD THE IMAGE 96-1 ─ ARTIFACTS:
         - NAME: TOMCAT.TAR.GZ
           URL: HTTP://FTP.PS.PL/PUB/APACHE/TOMCAT/
       TOMCAT-8/V8.5.24/BIN/APACHE-TOMCAT-
       8.5.24.TAR.GZ
           MD5: 080075877A66ADF52B7F6D0013FA9730

96-2 ─ EXECUTE:
         - SCRIPT: INSTALL.SH 96-3 ─ RUN:
         CMD:
           - "/HOME/USER/APACHE-TOMCAT-8.5.24/BIN/
       CATALINA.SH"
           - "RUN"
```

⎬ TOMCAT MODULE

*FIG. 3C*

```
66 ─┐      # THIS IS A DOCKERFILE FOR THE GOLDMANN/TOMCAT:1.0 IMAGE.
102-1 ─{   FROM CENTOS:7
           # ENVIRONMENT VARIABLES
        ┌  ENV JBOSS_IMAGE_NAME="GOLDMANN/TOMCAT" \
102-2 ─┤       JBOSS_IMAGE_VERSION="1.0" \
        └      JAVA_HOME="/USR/LIB/JVM/JAVA-1.8.0-OPENJDK"
           # LABELS
        ┌  LABEL NAME="$JBOSS_IMAGE_NAME" \
        │      VERSION="$JBOSS_IMAGE_VERSION" \
        │      ARCHITECTURE="X86_64" \
102-3 ─┤       COM.REDHAT.COMPONENT="GOLDMANN-TOMCAT-DOCKER" \
        │      DESCRIPTION="TOMCAT 8 IMAGE" \
        └      SUMMARY="TOMCAT 8 IMAGE"
           USER ROOT
           # INSTALL REQUIRED RPMS AND ENSURE THAT THE PACKAGES WERE INSTALLED
        ┌  RUN YUM INSTALL -Y  JAVA-1.8.0-OPENJDK-DEVEL \
102-4 ─┤       && YUM CLEAN ALL && \
        └      RPM -Q  JAVA-1.8.0-OPENJDK-DEVEL
           # ADD ALL ARTIFACTS TO THE /TMP/ARTIFACTS
           # DIRECTORY
        ┌  COPY \
102-5 ─┤       TOMCAT.TAR.GZ \
        └      /TMP/ARTIFACTS/

┌  # ADD SCRIPTS USED TO CONFIGURE THE IMAGE
102-6 ─┤   COPY MODULES /TMP/SCRIPTS

┌  # CUSTOM SCRIPTS
102-7 ─┤   USER ROOT
        └  RUN [ "BASH", "-X", "/TMP/SCRIPTS/USER/CREATE.SH" ]

102-8 ─{   USER ROOT
           RUN [ "BASH", "-X", "/TMP/SCRIPTS/TOMCAT/INSTALL.SH" ]

┌  USER ROOT
102-9 ─┤   RUN RM -RF /TMP/SCRIPTS
        │  USER ROOT
        └  RUN RM -RF /TMP/ARTIFACTS

┌  USER 1000
        │
102-10 ┤
        │  # SPECIFY THE WORKING DIRECTORY
        └  WORKDIR /HOME/USER 102-11 {   CMD ["/HOME/USER/APACHE-TOMCAT-8.5.24/BIN/CATALINA.SH", "RUN"]
```

*FIG. 3D*

112 — INSTALL.SH

```sh
#!/BIN/SH
SET -E

TAR -C /HOME/USER -XF /TMP/ARTIFACTS/APOLLO.TAR.GZ

CHOWN USER:USER -R /HOME/USER
```

114 — BROKER.SH

```sh
#!/BIN/SH
SET -E

APOLLO_VERSION="1.7.1"

CD /HOME/USER

/HOME/USER/APACHE-APOLLO-${APOLLO_VERSION}/BIN/APOLLO CREATE BROKER
```

116 — MODULE.YAML

```yaml
SCHEMA_VERSION: 1

NAME: APOLLO
VERSION: 1.7.1
DESCRIPTION: "MODULE USED TO INSTALL APACHE APOLLO"

# DEFINED ARTIFACTS THAT ARE USED TO BUILD THE
ARTIFACTS:
  - NAME: APOLLO.TAR.GZ
    URL: HTTP://FTP.PS.PL/PUB/APACHE/ACTIVEMQ/ACTIVEMQ-APOLLO/1.7.1/APACHE-APOLLO-1.7.1-UNIX-DISTRO.TAR.GZ
    MD5: AE189E7AA90A12DFFD5F9E4DA3F11275

EXECUTE:
  - SCRIPT: INSTALL.SH
  - SCRIPT: BROKER.SH
    USER: 1000

RUN:
  CMD:
    - "/HOME/USER/BROKER/BIN/APOLLO-BROKER"
    - "RUN"
```

} APOLLO MODULE

FIG. 4B

```
# THIS IS A DOCKERFILE FOR THE GOLDMANN/APOLLO:1.7 IMAGE.
FROM CENTOS:7
# ENVIRONMENT VARIABLES
ENV JBOSS_IMAGE_NAME="GOLDMANN/APOLLO" \
    JBOSS_IMAGE_VERSION="1.7" \
    JAVA_HOME="/USR/LIB/JVM/JAVA-1.8.0-OPENJDK"
# LABELS
LABEL NAME="$JBOSS_IMAGE_NAME" \
    VERSION="$JBOSS_IMAGE_VERSION" \
    ARCHITECTURE="X86_64" \
    COM.REDHAT.COMPONENT="GOLDMANN-APOLLO-DOCKER" \
    DESCRIPTION="APOLLO 1.7 IMAGE" \
    SUMMARY="APOLLO 1.7 IMAGE"
USER ROOT
# INSTALL REQUIRED RPMS AND ENSURE THAT THE PACKAGES WERE INSTALLED
RUN YUM INSTALL -Y JAVA-1.8.0-OPENJDK-DEVEL \
    && YUM CLEAN ALL && \
    RPM -Q JAVA-1.8.0-OPENJDK-DEVEL

# ADD ALL ARTIFACTS TO THE /TMP/ARTIFACTS
# DIRECTORY
COPY \
    APOLLO.TAR.GZ \
    /TMP/ARTIFACTS/

# ADD SCRIPTS USED TO CONFIGURE THE IMAGE
COPY MODULES /TMP/SCRIPTS

# CUSTOM SCRIPTS
USER ROOT
RUN [ "BASH", "-X", "/TMP/SCRIPTS/USER/CREATE.SH" ]

USER ROOT
RUN [ "BASH", "-X", "/TMP/SCRIPTS/APOLLO/INSTALL.SH" ]

USER 1000
RUN [ "BASH", "-X", "/TMP/SCRIPTS/APOLLO/BROKER.SH" ]

USER ROOT
RUN RM -RF /TMP/SCRIPTS
USER ROOT
RUN RM -RF /TMP/ARTIFACTS

USER 1000

# SPECIFY THE WORKING DIRECTORY
WORKDIR /HOME/USER

CMD ["/HOME/USER/BROKER/BIN/APOLLO-BROKER", "RUN"]
```

FIG. 4C

CONTAINER IMAGE BUILDING USING SHARED RESOURCES

TECHNICAL FIELD

The examples relate generally to building containers, and in particular to building container images using shared resources.

BACKGROUND

Containerization technologies, such as Docker, are increasingly popular due in part to the relatively light-weight processing requirements of containers compared to other virtualization technologies, such as virtual machines. A container image is a stand-alone executable package that includes everything needed to run it, such as executables, system tools, system libraries, settings, and the like.

In order to generate a container image that contains the appropriate executable and dependencies, a developer generates a container command file (e.g., a Dockerfile) that identifies the executable(s) and all the dependencies that are needed for the executable to run. A container builder reads the container command file and generates a container image based on the instructions in the container command file.

SUMMARY

The examples implement container image building using shared resources. The examples facilitate consistent implementation of resources in containers across an organization in an automated manner.

In one example a method is provided. The method includes reading, by a computing device comprising a processor device, a first instruction file that contains a first plurality of instruction keywords. The method further includes, based on the first plurality of instruction keywords, copying, by the computing device, a first plurality of files from a shared location to a first consolidated location. The method further includes, based on the first plurality of instruction keywords, generating, by the computing device, a first container command file that references at least some of the first plurality of files on the first consolidated location, the first container command file including commands that comply with a container builder syntax.

In another example, a computing device is provided. The computing device includes a memory and a processor device coupled to the memory. The processor device is to read a first instruction file that contains a first plurality of instruction keywords. The processor device is further to, based on the first plurality of instruction keywords, copy a first plurality of files from a shared location to a first consolidated location. The processor device is further to, based on the first plurality of instruction keywords, generate a first container command file that references at least some of the first plurality of files on the first consolidated location, the first container command file including commands that comply with a container builder syntax.

In another example a computer program product is provided. The computer program product is stored on a non-transitory computer-readable storage medium and includes instructions to cause a processor device to read a first instruction file that contains a first plurality of instruction keywords. The instructions further cause the processor device to, based on the first plurality of instruction keywords, copy a first plurality of files from a shared location to a first consolidated location. The instructions further cause the processor device to, based on the first plurality of instruction keywords, generate a first container command file that references at least some of the first plurality of files on the first consolidated location, the first container command file including commands that comply with a container builder syntax.

Individuals will appreciate the scope of the disclosure and realize additional aspects thereof after reading the following detailed description of the examples in association with the accompanying drawing figures.

BRIEF DESCRIPTION OF THE DRAWINGS

The accompanying drawing figures incorporated in and forming a part of this specification illustrate several aspects of the disclosure and, together with the description, serve to explain the principles of the disclosure.

FIGS. 3A-3D are block diagrams that illustrate container image building using shared resources according to another example;

FIGS. 4A-4C are block diagrams that illustrate container image building using shared resources according to another example;

DETAILED DESCRIPTION

Figure 1:
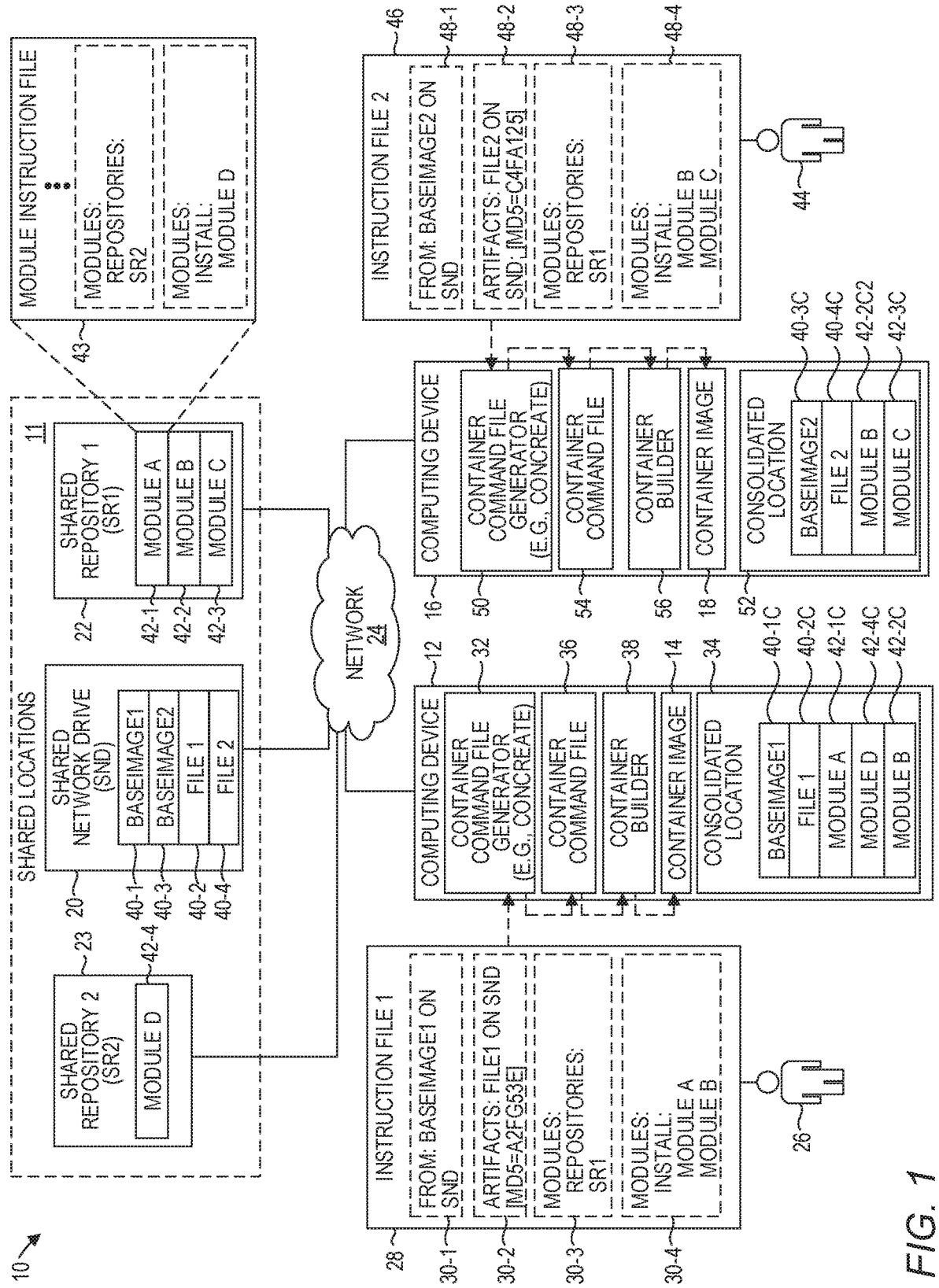
FIG. 1 is a block diagram of an environment for implementing shared resources in container command files according to one example.

The examples set forth below represent the information to enable individuals to practice the examples and illustrate the best mode of practicing the examples. Upon reading the following description in light of the accompanying drawing figures, individuals will understand the concepts of the disclosure and will recognize applications of these concepts not particularly addressed herein. It should be understood that these concepts and applications fall within the scope of the disclosure and the accompanying claims.

Any flowcharts discussed herein are necessarily discussed in some sequence for purposes of illustration, but unless otherwise explicitly indicated, the examples are not limited to any particular sequence of steps. The use herein of ordinals in conjunction with an element is solely for distinguishing what might otherwise be similar or identical labels, such as "first plurality of files" and "second plurality of files," and does not imply a priority, a type, an importance, or other attribute, unless otherwise stated herein. The term "about" used herein in conjunction with a numeric value means any value that is within a range of ten percent greater than or ten percent less than the numeric value. As used herein and in the claims, the articles "a" and "an" in reference to an element refers to "one or more" of the element unless otherwise explicitly specified.

Containerization technologies, such as Docker, utilize an instruction file, such as a Dockerfile, to generate a container image. The container image is a stand-alone executable package that includes all the resources needed to run, such as executable(s), system tools, system libraries, settings, and the like.

Often different container images utilize some of the same resources. For example, any number of different container images may utilize a particular Java™ technology. There may be multiple actions necessary to install the Java™ technology into a container image, and each action may be implemented via a separate command in a container command file. In the same organization, these actions may be identical irrespective of the container image in which the Java™ technology will be included. Nevertheless, there are no mechanisms for automatically generating these series of commands for each container in which the Java™ technology is included. Instead, a developer writes the series of commands for each new container command file, or copies the series of commands from a previously generated container command file. This can be time-consuming and increases the likelihood that a container command will be incorrectly entered. This can result in increased debugging efforts and decreased reliability of container images. Moreover, an organization may desire that a certain version of the Java™ technology be used throughout the organization, and/or that the Java™ technology be implemented with certain other features in a uniform, consistent manner throughout the organization. A uniform and consistent implementation is less likely if each individual developer is responsible for ensuring that the precise series and content of commands are included in each individual container command file.

The examples implement resource sharing in container command files and ensure that container resources can be shared by any number of developers in an automated and consistent manner. The examples automatically generate container command files in a predetermined format/syntax, such as a Dockerfile in the Docker syntax, that include commands (e.g., instructions) for including shared resources into a container image. The examples can also automatically generate a container image using the container command file.

FIG. 1 is a block diagram of an environment 10 for implementing shared resources in container command files according to one example. The environment 10 includes a computing device 12 on which a container image 14 will be generated according to the examples disclosed herein. The environment 10 also includes a computing device 16 on which a container image 18 will be generated according to the examples disclosed herein. The container image 14 and the container image 18, as will be discussed in greater detail below, both utilize at least one shared resource.

The environment 10 includes shared locations 11 which, in this example, include a shared network drive 20 and two shared repositories 22, 23. The shared network drive 20 may comprise, for example, a network-attached drive that is accessible by one or more computing devices used in an organization, such as a software manufacturing company, by way of non-limiting example. The shared repositories 22, 23 may comprise, for example, public repositories such as GitHub (github.com) that are accessible to anyone who has access to the Internet, and, if secured, the appropriate authentication information. The computing devices 12, 16 may access the shared network drive 20 and the shared repositories 22, 23 via one or more networks 24.

The container image 14 implements a desired functionality. According to the examples disclosed herein, to generate the container image 14, a user 26, such as a software engineer, creates an instruction file 28. The instruction file 28 comprises a plurality of instructions 30-1-30-4 (generally, plurality of instructions 30) that comport with a syntax of a container command file generator 32. One syntax for the container command file generator 32 that utilizes certain instruction keywords is provided below, but the container command file generator 32 disclosed herein is not limited to any particular syntax. The container command file generator 32, based on the plurality of instructions 30, performs certain functions, such as copying shared resources from the shared locations 11, such as the shared network drive 20 and/or the shared repository 22, to a consolidated location 34. The container command file generator 32 also, based on the plurality of instructions 30, generates a container command file 36 that contains a plurality of commands that comport with a syntax of a container builder 38. In this example, the container builder 38 comprises Docker, and the commands in the container command file 36 comport with a Dockerfile syntax. However, the examples disclosed herein may be used in conjunction with any containerization technology.

The container command file generator 32 may also automatically, without human involvement, initiate the container builder 38 to use the container command file 36 to generate the container image 14. The container image 14 may subsequently be executed to implement the desired functionality.

It will be noted that because the container command file generator 32 is a component of the computing device 12, functionality implemented by the container command file generator 32 may be attributed herein to the computing device 12 generally. Moreover, in examples where the container command file generator 32 comprises software instructions that program a processor device to carry out functionality discussed herein, functionality implemented by the container command file generator 32 may be attributed herein to such processor device.

In this example, the instruction file 28 contains an instruction 30-1 that includes a "FROM" instruction keyword with a parameter "BASEIMAGE1 ON SND". The container command file generator 32 recognizes the FROM instruction keyword as identifying a base image for the container image 14 that will be generated. The parameter BASEIMAGE1 ON SND indicates that the base image is a file 40-1 entitled BASEIMAGE1 located on the shared network drive 20 (SND). The container command file generator 32 copies the file 40-1 from the shared network drive 20 to the consolidated location 34 to generate a copy 40-1C of the file 40-1. The container command file generator 32 may also generate and insert into the container command file 36 one or more commands. Specific examples of commands that may be generated by the container command file generator 32 are provided below with reference to FIGS. 3A-4C.

The instruction file 28 contains an instruction 30-2 that includes an "ARTIFACTS" instruction keyword followed by two parameters, "FILE1 ON SND" and "[MD5= A2FG53E]". The ARTIFACTS keyword is used to identify individual files that will be added to the container image 14. The parameter FILE1 ON SND identifies a file 40-2 (FILE1) on the shared network drive 20 (SND). In response to the instruction 30-2, the container command file generator 32 copies the file 40-2 from the shared network drive 20 to the consolidated location 34 to generate a copy 40-2C of the file 40-2. The parameter [MD5=A2FG53E] in the instruction 30-2 identifies an optional verification value that is associated with the file 40-2. If present, after the container command file generator 32 has copied the file 40-2 to the consolidated location 34, the container command file generator 32 runs a verification algorithm against the file 40-2C to generate a generated verification value. If the generated verification value matches the verification value identified in the instruction 30-2, the container command file generator 32 determines that the file 40-2C is the correct file. The container command file generator 32 may also generate and insert into the container command file 36 one or more commands based on the instruction 30-2. If the generated verification value does not match the verification value, the container command file generator 32 may generate an alert, such as a message, that indicates that the verification values did not match. In response, the container command file generator 32 may terminate the process.

The verification algorithm may comprise any suitable algorithm that reliably generates a same value if the exact same data is processed by the algorithm. Non-limiting examples of verification algorithms include MD5, SHA1, and SHA256 verification algorithms. In this example, the instruction 30-2 identifies the MD5 verification algorithm as the verification algorithm to use.

The instruction file 28 contains an instruction 30-3 that includes a "MODULES" instruction keyword followed by a "REPOSITORIES" instruction keyword, and a parameter "SR1". This identifies the shared repository 22 (SR1) as a location where subsequently identified modules are located. A module is a directory of one or more files. The one or more files may include a module instruction file that contains instructions in a similar or identical syntax to that of the instruction file 28. Thus, modules are a way of encapsulating a series of instructions and files that relate to a particular shared resource. For example, to install a particular Java™ technology into a container image, an organization may desire that the files associated with the particular Java™ technology are copied from a particular shared resource, that certain script files are run prior to initiating the Java™ technology, and that certain environment variables are used. A module is a mechanism by which all these actions, and any additional desired actions, may be identified, and uniformly and consistently applied to any container image by the container command file generator 32.

The instruction file 28 contains an instruction 30-4 that includes the "MODULES" instruction keyword followed by an "INSTALL" instruction keyword. The "INSTALL" instruction keyword is followed by two parameters "MODULE A" and "MODULE B". The container command file generator 32 then accesses the shared repository 22 (SR1) and locates the modules 42-1 (MODULE A) and 42-2 (MODULE B) and copies the modules 42-1, 42-2 to the consolidated location 34 as modules 42-1C and 42-2C. For each module 42-1C and 42-2C the container command file generator 32 accesses a module instruction file contained within the respective module and processes the module instruction file in a similar manner to that described herein with regard to the instruction file 28. The container command file generator 32 also generates and inserts into the container command file 36 one or more commands based on the module instruction files.

In this example, assume that a module instruction file 43 in the module 42-1 (MODULE A) includes a "MODULES" instruction keyword followed by a "REPOSITORIES" instruction keyword and the parameter "SR2". The module instruction file 43 also includes a "MODULES" instruction keyword followed by an "INSTALL" instruction keyword and the parameter "MODULE D." The container command file generator 32 then accesses the shared repository 23 (SR2) and locates the module 42-4 (MODULE D) and copies the module 42-4 to the consolidated location 34 as module 42-4C. This example illustrates the recursive nature of module instruction files in that any module instruction file may refer to other modules that are to be installed.

After processing the instruction file 28 and any module instruction files in the modules 42-1C and 42-2C, the container command file generator 32 may initiate the container builder 38 to use the container command file 36 to generate the container image 14.

The container image 18 implements a desired functionality that is different from that of the container image 14, but that utilizes a same resource, the module 42-2, as is used by the container image 14. Similar to the manner discussed above with regard to the instruction file 28, a user 44, such as another software engineer, creates an instruction file 46. The instruction file 46 contains a plurality of instructions 48-1-48-4 that comport with the syntax of a container command file generator 50. The container command file generator 50 is a copy of the container command file generator 32 and thus operates substantially similarly as discussed above with regard to the container command file generator 32. Based on the instruction 48-1, the container command file generator 50 copies a file 40-3 (BASEIMAGE2) from the shared network drive 20 (SND) to a consolidated location 52 as a copy 40-3C of the file 40-3. The container command file generator 50 may also generate and insert into a container command file 54 one or more commands that comport with a syntax of a container builder 56, which, in this example, is a copy of the container builder 38. Based on the instruction 48-2, the container command file generator 50 copies a file 40-4 (FILE 2) from the shared network drive (SND) 20 to the consolidated location 52 as a copy 40-4C of the file 40-4. The container command file generator 50 also performs an MD5 verification algorithm on the file 40-4C and determines that the generated verification value matches the verification value provided in the instruction 48-2.

Based on the instructions 48-3-48-4, the container command file generator 50 accesses the shared repository 22 (SR1), locates the modules 42-2 (MODULE B) and 42-3 (MODULE C), and copies the modules 42-2, 42-3 to the consolidated location 52 as modules 42-2C2 and 42-3C. For each module 42-2C2 and 42-3C, the container command file generator 50 accesses a module instruction file contained within the respective module 42 and processes the module instruction file in a similar manner to that described herein with regard to the instruction file 46. The container command file generator 50 also generates and inserts into the container command file 54 one or more commands based on the module instruction files. Note that the module 42-2 in the shared repository 22 is used by both the container image 14 and the container image 18.

After processing the instruction file 46 and any module instruction files in the modules 42-2C2 and 42-3C, the container command file generator 50 may initiate the container builder 56 to use the container command file 54 to generate the container image 18.

Figure 2:
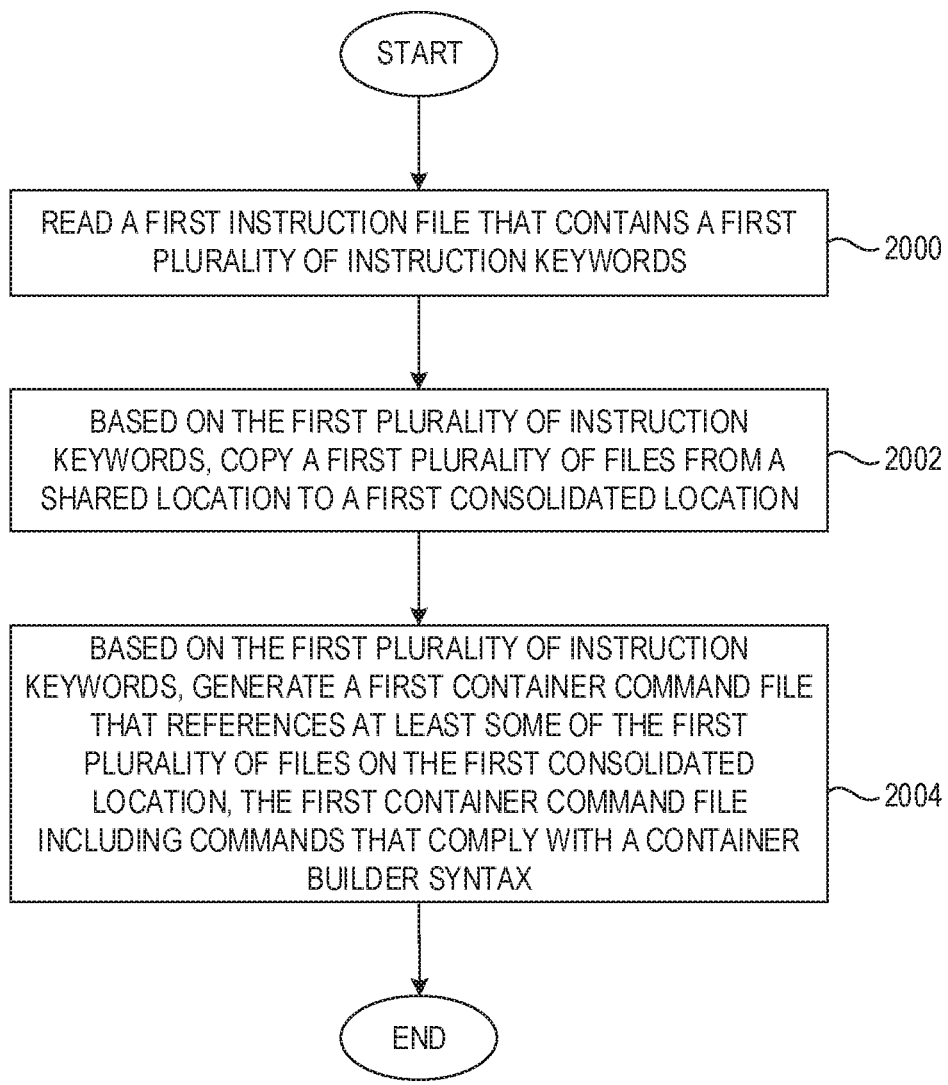
FIG. 2 is a flowchart of a method for container image building using shared resources according to one example.

FIG. 2 is a flowchart of a method for container image building using shared resources according to one example. FIG. 2 will be discussed in conjunction with FIG. 1. The container command file generator 32 reads the instruction file 28 which contains a first plurality of instruction keywords in the plurality of instructions 30-1-30-4 (FIG. 2, block 2000). Based on the first plurality of instruction keywords, the container command file generator 32 copies the files 40-1, 40-2, and those contained in the modules 42-1, 42-2 to the consolidated location 34 (FIG. 2, block 2002). Based on the first plurality of instruction keywords, the container command file generator 32 generates the container command file 36 that references at least some of the plurality of files 40-1C, 40-2C, and those in the modules 42-1C and 42-2C on the consolidated location 34. The container command file 36 includes commands that comply with a container builder syntax of the container builder 38 (FIG. 2, block 2004).

FIGS. 3A-3D are block diagrams that illustrate container image building using shared resources according to another example. In this example, the user 26 has generated an instruction file 60 to create a container image 62 that implements an Apache Tomcat functionality. In this example, the instruction file 60 utilizes the YAML Ain't Markup Language (YAML) programming language with certain predetermined instruction keywords and parameters understood by the container command file generator 32 as will be discussed below in detail. The instruction file 60 comprises a plurality of instructions 64-1-64-6 (generally, instructions 64). The instructions 64 generally include one or more instruction keywords, which are predetermined keywords known by the container command file generator 32, and one or more parameters, which are data provided by the user 26 that may differ for different container images.

For purposes of illustration, only certain instruction keywords will be discussed in detail with regard to FIGS. 3A-3D. However, FIGS. 3A-3D relate to a "Concreate" version of the container command file generator 32, and full documentation for the "Concreate" version of the container command file generator 32 is provided below, and thus information on all instruction keywords in the instruction file 60, whether discussed with regard to FIGS. 3A-3D or not, are discussed below in such documentation.

Figure 3A:
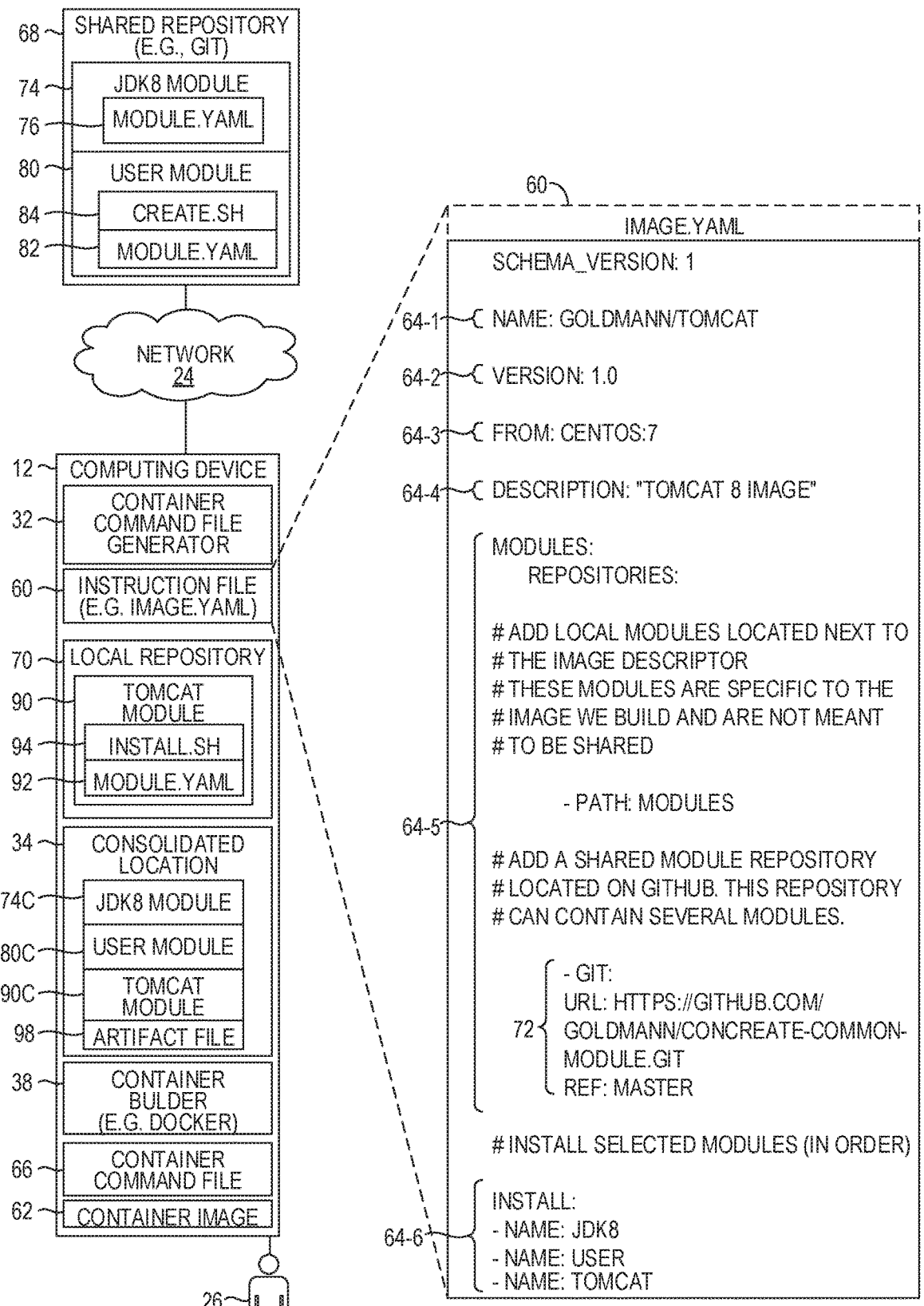

FIGS. 3A-3C will be described to illustrate a flow of processing undertaken by the container command file generator 32 in response to instruction keywords. FIG. 3D illustrates a container command file 66 generated by the container command file generator 32 in response to the instruction keywords. The discussion of FIG. 3D will focus on correlating instruction keywords from the instruction file 60 and from a plurality of module instruction files with commands generated by the container command file generator 32 in response to such instruction keywords. Thus, generally, the exact commands generated by the container command file generator 32 in response to a keyword will not be discussed with regard to FIGS. 3A-3C because that is the focus of the discussion of FIG. 3D.

Referring first to FIG. 3A, the computing device 12 is communicatively coupled to a shared repository 68, which, in this example, is the GitHub shared repository (github.com). The user 26 initiates the container command file generator 32 and either provides the container command file generator 32 with the name of the instruction file 60, or, in some examples, the container command file generator 32 may expect that the instruction file 60 be titled a predetermined name, such as "IMAGE.YAML" and be present in the current directory in which the container command file generator 32 is executed.

The container command file generator 32 begins processing the instruction file 60 by parsing the instruction file 60 looking for instruction keywords. Lines that are preceded by a "#" character are comments and are ignored by the container command file generator 32. The container command file generator 32 identifies an instruction 64-1 that has the instruction keyword "NAME" and an instruction 64-2 with an instruction keyword "VERSION", both of which are followed by certain parameters. In response to the instructions 64-1, 64-2, the container command file generator 32 generates commands in the container command file 66, which will be discussed in greater detail below with regard to FIG. 3D.

The container command file generator 32 identifies an instruction 64-3 with an instruction keyword "FROM" which is followed by a parameter "CENTOS:7". The instruction 64-3 identifies a base image for the container image 62. The container command file generator 32 identifies an instruction 64-4 with an instruction keyword "DESCRIPTION" which is followed by a parameter "TOMCAT 8 IMAGE", which is a short textual description of the container image 62.

The container command file generator 32 identifies an instruction 64-5 with the instruction keywords "MODULES" and "REPOSITORIES". These instruction keywords precede parameters that identify locations where modules are located. The instruction keyword "PATH" is used to identify a local repository 70 that contains modules that are not intended to be shared among multiple users. The instruction keyword "GIT" identifies the GitHub shared repository 68. The instruction keyword GIT is followed by a parameter 72 that identifies a particular repository for shared modules. In summary, the instruction 64-5 identifies two locations where subsequently identified modules may be located, the local repository 70 and the shared repository 68. While for purposes of illustration only two repositories are illustrated, it will be apparent that the instruction file 60 could identify any number of repositories.

The container command file generator 32 identifies an instruction 64-6 with the instruction keyword "INSTALL". The INSTALL instruction keyword is followed by one or more parameters that identify modules to be installed, and the order in which the modules are to be installed. In this example, the INSTALL instruction keyword is followed by an identification of three modules, "JDK8", "USER" and "TOMCAT".

A module is a directory (i.e., folder) that contains one or more module files. At least one of the module files is a module instruction file that contains instruction keywords that are a set of the same instruction keywords that are valid for the instruction file 60, as discussed in greater detail below in the Documentation section. In some examples, the module instruction files also utilize the YAML programming language.

In response to the instruction 64-6, the container command file generator 32 searches the local repository 70 for a JDK8 module. The container command file generator 32 does not locate the JDK8 module in the local repository 70, and then searches the shared repository 68. The container command file generator 32 identifies a JDK8 module 74 in the shared repository 68. The JDK8 module 74 has a single file 76 which is a module instruction file (MODULE.YAML). The container command file generator 32 copies the JDK8 module 74 from the shared repository 68 to the consolidated location 34 to generate a JDK8 module 74C (i.e., copies the file 76 to the consolidated location 34). The consolidated location 34 may comprise, for example, a local directory on a storage device of the computing device 12.

The container command file generator 32 then processes the module instruction file 76 in the copied module 74C. FIG. 3B illustrates the contents of the module instruction file 76 according to one example. Referring now to FIG. 3B, the module instruction file 76 contains an instruction 78-1 with instruction keywords "ENVS", "NAME", and "VALUE". The instruction keyword ENVS is used to identify environment variables that are to be available to the container image 62 during the execution of the container image 62. For purposes of clarity, it is noted that there are two relevant phases associated with the container image 62. The first phase is during the building of the container image 62. The container builder 38 builds the container image 62 based on the container command file 66. The second phase is during the execution phase of the container image 62. The execution phase occurs when a user, or a system, initiates the container image 62 to provide the desired functionality that is implemented by the container image 62. In response to the instruction 78-1, the container command file generator 32 generates and inserts certain commands into the container command file 66, as will be discussed below with regard to FIG. 3D.

The container command file generator 32 identifies an instruction 78-2 with "PACKAGES" and "INSTALL" instruction keywords. The PACKAGES instruction keyword is used to identify packages, such as RPM packages, that are to be installed. In response to the instruction 78-1, the container command file generator 32 generates and inserts certain commands into the container command file 66, as will be discussed below with regard to FIG. 3D. This completes the processing of the module instruction file 76 and the copied module 74C (JDK8).

Referring again to FIG. 3A, the container command file generator 32 next searches the local repository 70 for a USER module. The container command file generator 32 does not locate the USER module in the local repository 70, and then searches the shared repository 68. The container command file generator 32 identifies a USER module 80 in the shared repository 68. The USER module 80 contains a module instruction file 82 (MODULE.YAML), and a shell script file 84 (CREATE.SH). The container command file generator 32 copies the USER module 80 from the shared repository 68 to the consolidated location 34 to generate a USER module 80C.

The container command file generator 32 then processes the module instruction file 82. FIG. 3B illustrates the contents of the module instruction file 82 according to one example. Referring now to FIG. 3B, the module instruction file 82 contains an instruction 86-1 with instruction keywords "EXECUTE" and "SCRIPT" followed by the parameter "CREATE.SH". The EXECUTE instruction keyword identifies scripts that are to be executed by the container builder 38 during the build phase of the container image 62. The parameter CREATE.SH refers to the shell script file 84 (CREATE.SH). The shell script file 84 contains two script commands 88-1, 88-2 that will be executed when the shell script file 84 is processed by the container builder 38 during the build phase of the container image 62. In response to the instruction 86-1, the container command file generator 32 generates and inserts certain commands into the container command file 66, as will be discussed below with regard to FIG. 3D.

The container command file generator 32 identifies an instruction 86-2 that includes the instruction keywords "RUN", "USER", and "WORKDIR". The RUN instruction keyword identifies instructions/parameters that are to be provided to the container image 62 at the execution phase. In response to the instruction 86-2, the container command file generator 32 generates and inserts certain commands into the container command file 66, as will be discussed below with regard to FIG. 3D. This completes the processing of the module instruction file 82 and the copied module 80C (USER).

Referring again to FIG. 3A, the container command file generator 32 next searches the local repository 70 for a TOMCAT module. The container command file generator 32 locates a TOMCAT module 90 in the local repository 70. The TOMCAT module 90 contains a module instruction file 92 (MODULE.YAML), and a shell script file 94 (IN-STALL.SH). The container command file generator 32 copies the TOMCAT module 90 from the local repository 70 to the consolidated location 34 to generate a TOMCAT module 90C.

The container command file generator 32 then processes the module instruction file 92 (MODULE.YAML). FIG. 3C illustrates the contents of the module instruction file 92 according to one example. Referring now to FIG. 3C, the container command file generator 32 identifies an instruction 96-1 with instruction keywords "ARTIFACTS", "NAME", "URL", and "MD5". The ARTIFACTS instruction keyword identifies individual files that are to be used to build the container image 62. The NAME instruction keyword identifies the name of the individual file. The URL instruction keyword identifies a location of the file. The MD5 instruction keyword identifies a verification value that is to be used by the container command file generator 32 to verify that the copied file is the correct file. In response to the instruction 96-1, the container command file generator 32 copies the file to the consolidated location 34 as the file 98. The container command file generator 32 also executes an MD5 algorithm against the file 98 to generate a verification value. The container command file generator 32 compares the generated verification value to the verification value identified in the instruction 96-1. If the verification values are identical, the container command file generator 32 continues processing. If the verification values are not identical, the container command file generator 32 may generate an alert and halt processing. For purposes of illustration, it will be assumed that the verification values matched. The container command file generator 32 also generates and inserts certain commands into the container command file 66 based on the instruction 96-1, as will be discussed below with regard to FIG. 3D.

The container command file generator 32 identifies an instruction 96-2 with instruction keywords "EXECUTE" and "SCRIPT" followed by the parameter "INSTALL.SH". As discussed previously, the EXECUTE instruction keyword identifies scripts that are to be executed by the container builder 38 during the build phase of the container image 62. The parameter INSTALL.SH refers to the shell script file 94 (INSTALL.SH). The shell script file 94 contains three script commands 100-1-100-3 that will be executed when the shell script file 94 is processed by the container builder 38 during the build phase of the container image 62. In response to the instruction 96-2, the container command file generator 32 generates and inserts certain commands into the container command file 66, as will be discussed below with regard to FIG. 3D.

The container command file generator 32 identifies an instruction 96-3 that includes the instruction keywords "RUN" and "CMD", followed by two parameters. As discussed above, the RUN instruction keyword identifies instructions/parameters that are to be provided to the container image 62 at the execution phase of the container image 62. In response to the instruction 96-3, the container command file generator 32 generates and inserts certain commands into the container command file 66, as will be discussed below with regard to FIG. 3D. This completes the processing of the module instruction file 92 and the copied TOMCAT module 90C (USER).

Referring again to FIG. 3A, the container command file generator 32 has completed processing the instruction file 60. The container command file generator 32 may now initiate the container builder 38 to use the container command file 66 that was created by the container command file generator 32 to generate the container image 62.

Referring now to FIG. 3D, the container command file 66 generated by the container command file generator 32 will be briefly discussed. In this example, the container command file 66 is a Dockerfile, and thus complies with the Docker command syntax. In essence, the container command file 66 comprises text that includes descriptive comments and valid Docker commands and parameters. The container command file 66 includes an entry 102-1 that identifies the base image from which the container builder 38 is to build the container image 62. The entry 102-1 was generated by the container command file generator 32 in response to the instruction 64-3 (FIG. 3A). The container command file 66 includes an entry 102-2 that identifies various environment variables for use in the container command file 66. The entry 102-2 was generated by the container command file generator 32 in response to the instructions 64-2, 64-3 (FIG. 3A) and 78-1 (FIG. 3B).

The container command file 66 includes an entry 102-3 that identifies various labels for use in the container command file 66. The container command file 66 includes an entry 102-4 that installs the package identified in instruction 78-2 (FIG. 3B) and identifies various labels for use in the container command file 66. The container command file 66 includes an entry 102-5 generated based on the instruction 96-1 (FIG. 3C). The container command file 66 includes an entry 102-6 that copies any script files (e.g., the shell script files 84, 94) to an appropriate directory. The container command file 66 includes an entry 102-7 that runs the shell script file 84 identified in the instruction 86-1 (FIG. 3B). The container command file 66 includes an entry 102-8 that runs the shell script file 94 identified in the instruction 96-2 (FIG. 3C). The container command file 66 includes an entry 102-9 that cleans up (i.e., removes) certain directories. The container command file 66 includes an entry 102-10 generated in response to the instruction 86-2 (FIG. 3B) that designates a user directory and a work directory. The container command file 66 includes an entry 102-11 generated in response to the instruction 96-3 (FIG. 3C).

Figure 4A:
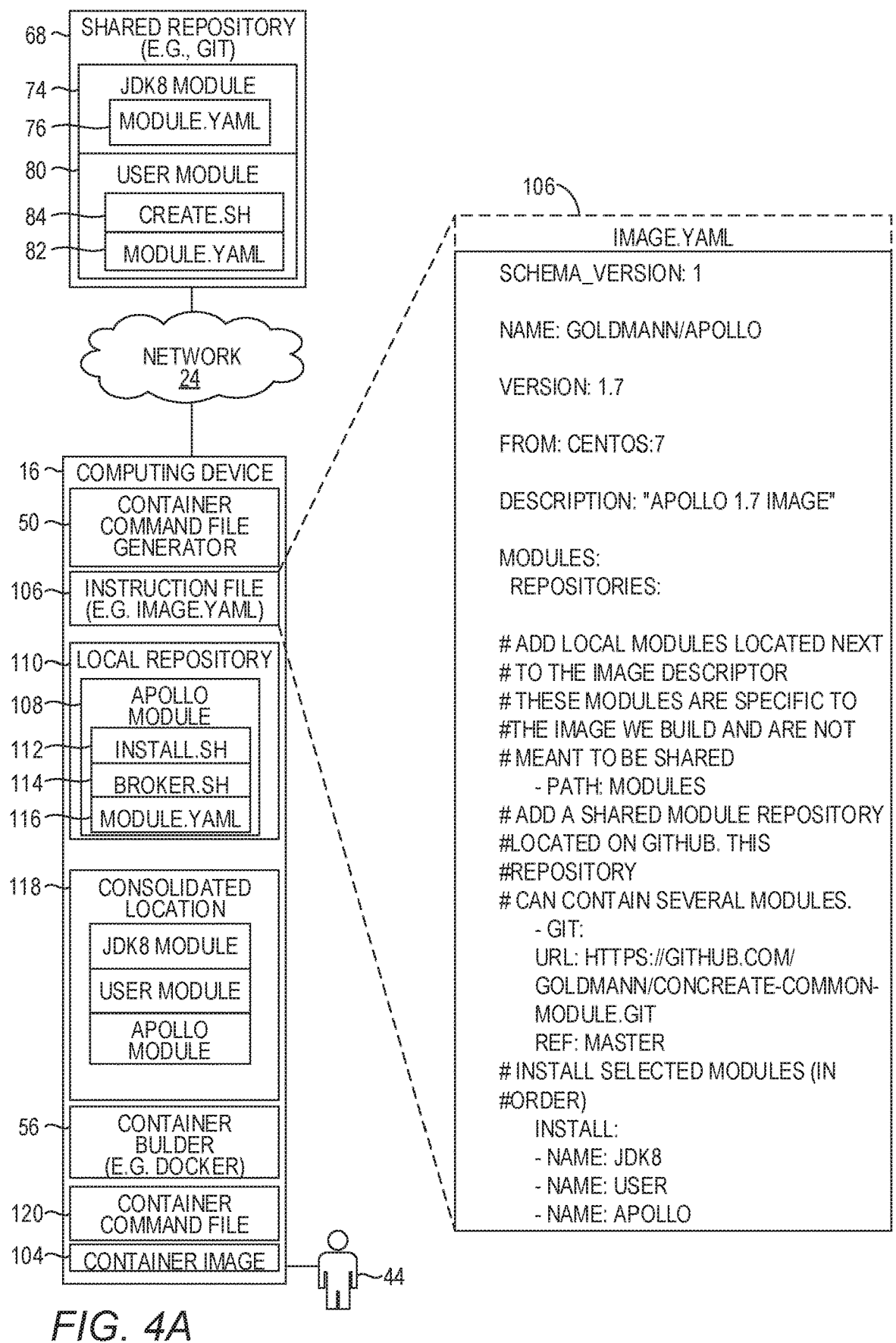

FIGS. 4A-4C are block diagrams that illustrate container image building using shared resources according to another example. In this example a container image 104 will be generated that shares certain of the modules used to generate the container image 62 described above, although the container image 104 has a different functionality than the container image 62. In this example the user 44 has generated an instruction file 106 to create the container image 104, which implements an Apollo functionality. In this example, the instruction file 106 utilizes the YAML programming language with certain predetermined instruction keywords and parameters understood by the container command file generator 50. The container command file generator 50 is a copy of the container command file generator 32 discussed with regard to FIGS. 3A-3D. For purposes of brevity, individual instructions will not be discussed in detail with regard to FIGS. 4A-4C. Again, the instruction keywords contained in the instruction file 106 and any module instruction files disclosed herein are explained in detail in the documentation for the "Concreate" version of the container command file generator 50 provided below.

Referring first to FIG. 4A, the computing device 16 is communicatively coupled to the shared repository 68, which, in this example, is the GitHub shared repository (github.com). The user 44 initiates the container command file generator 50 and either provides the container command file generator 50 with the name of the instruction file 106, or, in some examples, the container command file generator 50 may expect that the instruction file 106 have a predetermined name, such as "IMAGE.YAML" and be present in the current directory in which the container command file generator 50 is executing.

The container command file generator 50 begins processing the instruction file 106 by parsing the instruction file 60 looking for instruction keywords, as discussed above with regard to FIGS. 3A-3D. In this example, the instruction file 106 identifies three modules that are to be installed, the JDK8 module 74, the USER module 80 maintained in the shared repository 68, and an Apollo module 108 maintained in a local repository 110. The Apollo module 108 includes a script file 112 (INSTALL.SH), a script file 114 (BROKER.SH), and a module instruction file 116 (MODULE.YAML). The container command file generator 50 copies the identified modules from the respective repositories to a consolidated location 118.

FIG. 3B illustrates the contents of the shared JDK8 module 74 and the shared USER module 80. FIG. 4B illustrates the contents of the script file 112 (INSTALL.SH), the script file 114 (BROKER.SH), and the module instruction file 116.

Based on the instructions contained in the module instruction file 116, the module instruction file 76, and the module instruction file 82, the container command file generator 50 generates a container command file 120. The container command file generator 50 then initiates the container builder 56 to use the container command file 120 to generate the container image 104.

Figure 5:
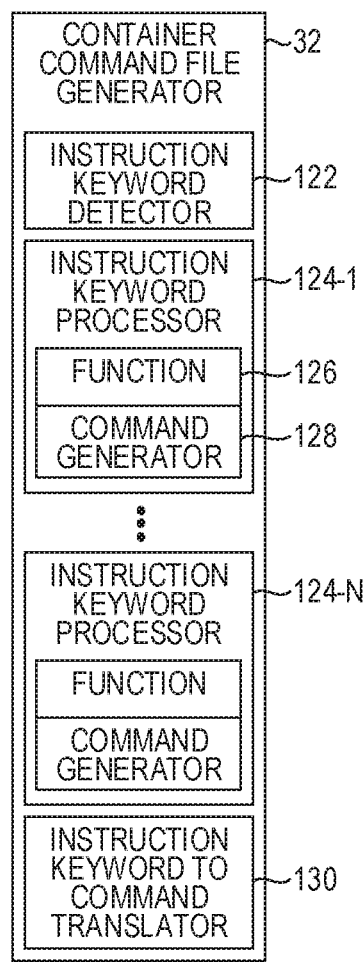
FIG. 5 is a block diagram of a container command file generator according to one example.

FIG. 5 is a block diagram of the container command file generator 32 according to one example. In this example, the container command file generator 32 includes an instruction keyword detector 122. The instruction keyword detector 122 is configured to read an instruction file, such as the instruction files 60, 106, and module instruction files, such as the module instruction files 76, 82, 92, and 116, and identify keyword instructions. In particular, the instruction keyword detector 122 may parse words in the instruction files and match the words against a predetermined list of keyword instructions, for example.

The instruction keyword detector 122 may then invoke, or pass control to, a particular instruction keyword processor 124-1-124-N, depending on the detected keyword instruction. Each instruction keyword processor 124 may be responsible for implementing the functionality associated with the particular instruction keyword, and generating any commands for the corresponding container command file. For example, upon detection of the "ARTIFACTS" instruction keyword, the instruction keyword detector 122 may pass control to the instruction keyword processor 124-1. The instruction keyword processor 124-1 may then parse the entire instruction in which the "ARTIFACTS" instruction keyword is detected. A function 126 may be configured to locate the artifact file, download the artifact file, and run a verification process against the artifact file to generate a verification value. A command generator 128 may then generate the corresponding commands for the container builder 56 and insert the commands in the container command file. An instruction keyword to command translator 130 may store data that, for each instruction keyword, identifies the appropriate command syntax of the command to be generated and stored in the container command file.

Figure 6:
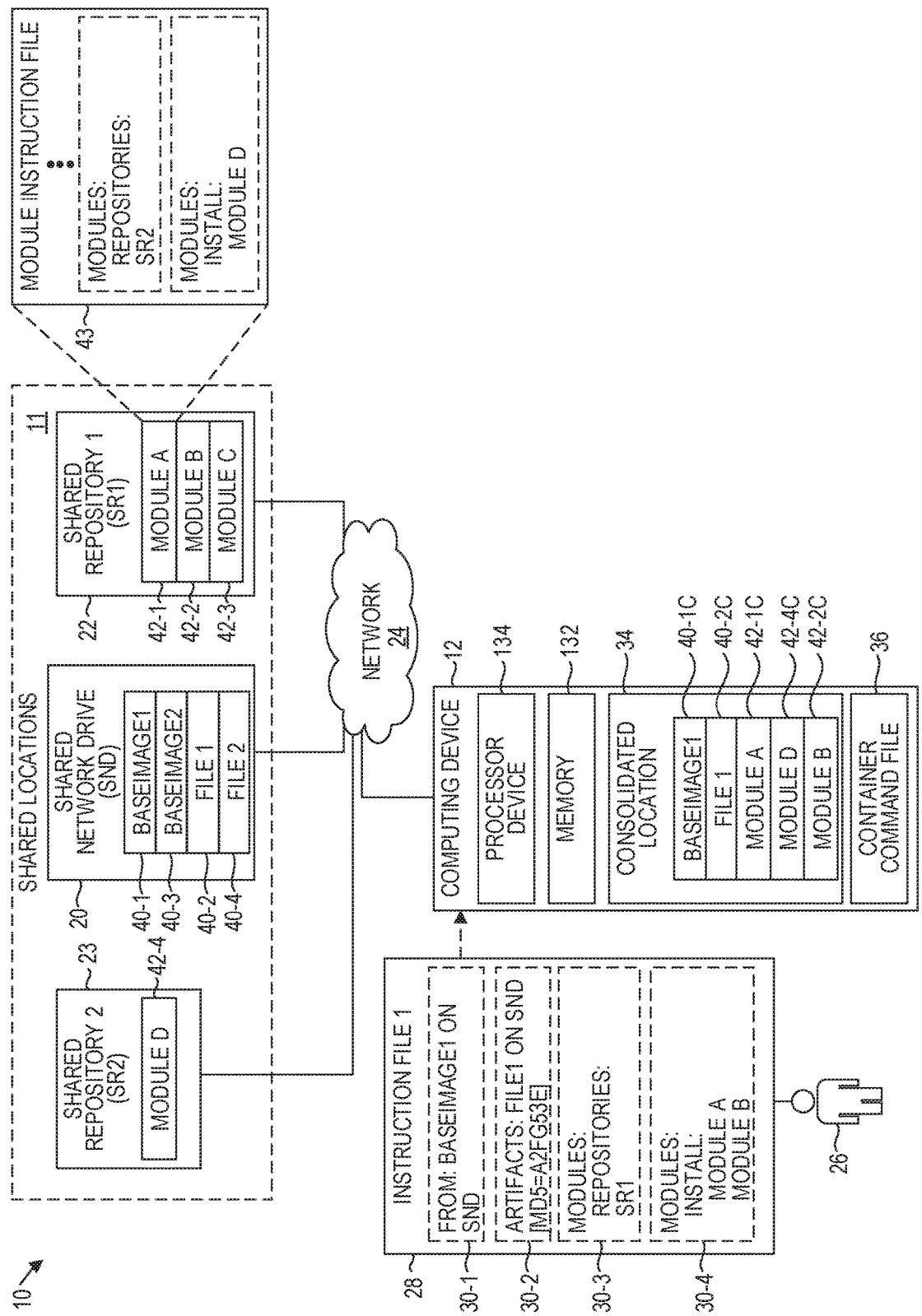
FIG. 6 is a simplified block diagram of FIG. 1 according to one example.

FIG. 6 is a simplified block diagram of FIG. 1 according to one example. The computing device includes a memory 132 and a processor device 134 coupled to the memory 132. The processor device 134 is to read the instruction file 28 that contains a plurality of instruction keywords. Based on the plurality of instruction keywords, the processor device 134 copies a plurality of files from the shared locations 11 to the consolidated location 34. Based on the plurality of instruction keywords, the processor device 134 generates the container command file 36 that references at least some of the plurality of files on the consolidated location 34, the container command file 36 including commands that comply with a container builder syntax.

Figure 7:
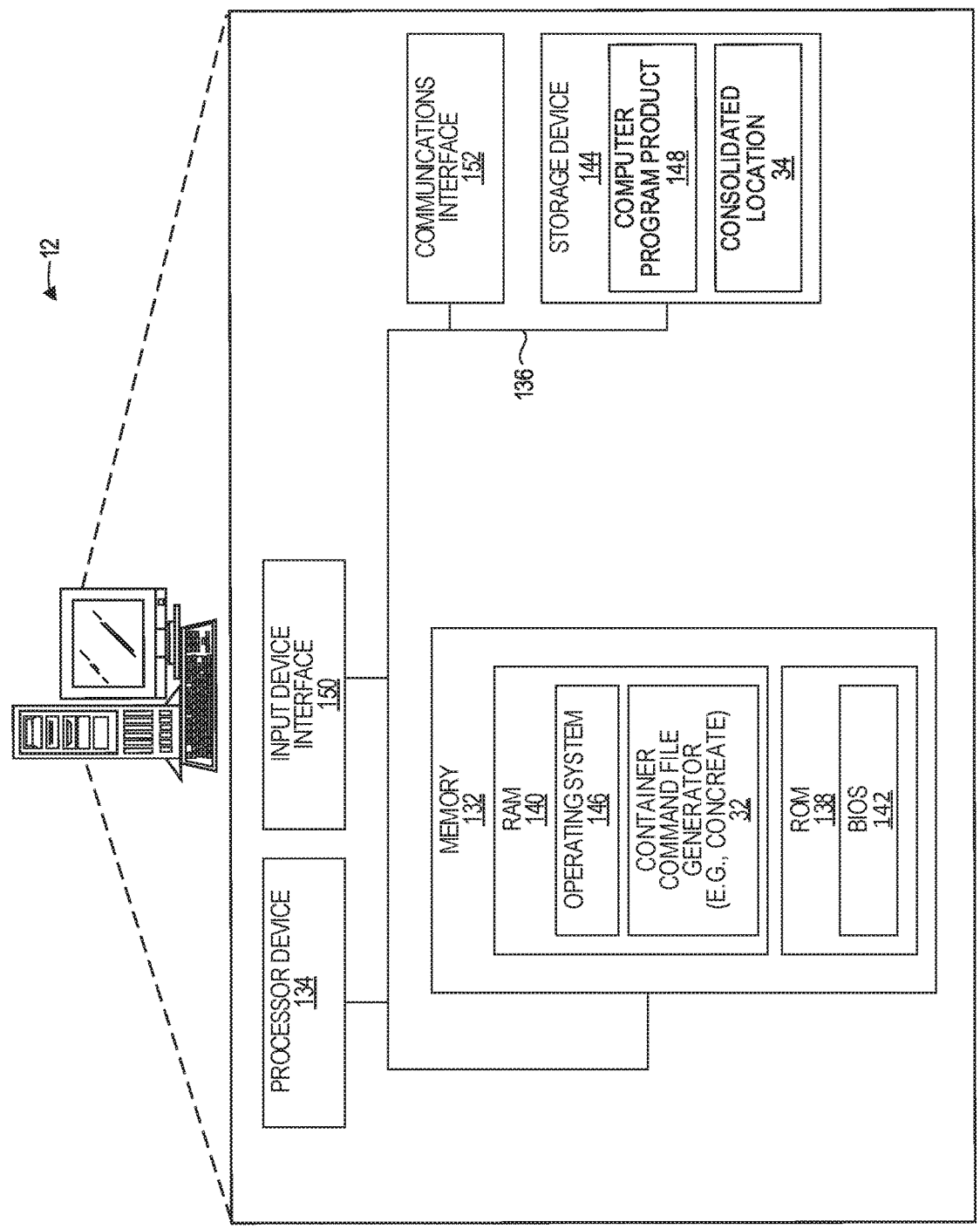
FIG. 7 is a block diagram of a computing device suitable for implementing examples disclosed herein.

FIG. 7 is a block diagram of the computing device 12 suitable for implementing examples disclosed herein. The computing device 12 may comprise any computing or electronic device capable of including firmware, hardware, and/or executing software instructions to implement the functionality described herein, such as a computer server, a desktop computing device, a laptop computing device, a smartphone, a computing tablet, or the like. The computing device 12 includes the processor device 134, the memory 132, and a system bus 136. The system bus 136 provides an interface for system components including, but not limited to, the memory 132 and the processor device 134. The processor device 134 can be any commercially available or proprietary processor.

The system bus 136 may be any of several types of bus structures that may further interconnect to a memory bus (with or without a memory controller), a peripheral bus, and/or a local bus using any of a variety of commercially available bus architectures. The memory 132 may include non-volatile memory 138 (e.g., read-only memory (ROM), erasable programmable read-only memory (EPROM), electrically erasable programmable read-only memory (EEPROM), etc.), and volatile memory 140 (e.g., random-access memory (RAM)). A basic input/output system (BIOS) 142 may be stored in the non-volatile memory 138 and can include the basic routines that help to transfer information between elements within the computing device 12. The volatile memory 140 may also include a high-speed RAM, such as static RAM, for caching data.

The computing device 12 may further include or be coupled to a non-transitory computer-readable storage medium such as a storage device 144, which may comprise, for example, an internal or external hard disk drive (HDD) (e.g., enhanced integrated drive electronics (EIDE) or serial advanced technology attachment (SATA)), HDD (e.g., EIDE or SATA) for storage, flash memory, or the like. The storage device 144 and other drives associated with computer-readable media and computer-usable media may provide non-volatile storage of data, data structures, computer-executable instructions, and the like. The storage device 144 may provide the consolidated location 34 for consolidating shared resources. The storage device 144 may also contain computer-executable instructions for performing novel methods of the disclosed examples.

A number of modules can be stored in the storage device 144 and in the volatile memory 140, including an operating system 146 and one or more program modules, such as the container command file generator 32, which may implement the functionality described herein in whole or in part.

All or a portion of the examples may be implemented as a computer program product 148 stored on a transitory or non-transitory computer-usable or computer-readable storage medium, such as the storage device 144, which includes complex programming instructions, such as complex computer-readable program code, to cause the processor device 134 to carry out the steps described herein. Thus, the computer-readable program code can comprise software instructions for implementing the functionality of the examples described herein when executed on the processor device 134. The processor device 134, in conjunction with the container command file generator 32 in the volatile memory 140, may serve as a controller, or control system, for the computing device 12 that is to implement the functionality described herein.

An operator, such as the user 26, may also be able to enter one or more configuration commands through a keyboard (not illustrated) or a pointing device such as a mouse (not illustrated). Such input devices may be connected to the processor device 134 through an input device interface 150 that is coupled to the system bus 136 but can be connected by other interfaces such as a parallel port, an Institute of Electrical and Electronic Engineers (IEEE) 1394 serial port, a Universal Serial Bus (USB) port, an IR interface, and the like.

The computing device 12 may also include a communications interface 152 suitable for communicating with the networks 24 as appropriate or desired.

Documentation for one example disclosed herein is provided below and referred to, collectively, as Concreate.

1.1 Installation
1.1.1 Fedora/CentOS/RHEL

It is suggested to install Concreate using the YUM/DNF package manager. A COPR repository is provided for Concreate which contains everything needed to install Concreate.

Fedora
Supported versions: 25, 26, 27.
dnf copr enable goldmann/concreate dnf install python3-concreate
CentOS
Supported versions: 7.

```
yum install yum-plugin-copr
yum copr enable goldmann/concreate
yum install python2-concreate
```

RHEL
Supported versions: 7.

```
curl   https://copr.fedorainfracloud.org/coprs/goldmann/concreate/repo/
epel-‹⸺⸺› 7/goldmann-concreate-epel-7.repo -o /etc/yum.repos.d/goldmann-
concreate-‹⸺⸺› epel-7.repo
yum install python2-concreate
```

1.1.2 Other Systems
It is strongly advised to use Virtualenv to install Concreate.

```
# Prepare virtual environment
virtualenv ~/concreate
source ~/concreate/bin/activate
# Install Concreate
# Execute the same command to upgrade to latest version
pip install -U concreate
# Now you are able to run Concreate
concreate --help
```

Requirements
To build container images you need to have a container builder, such as Docker, installed on your system.

1.2 Image Descriptor File
The user facing part of Concreate is the descriptor file (referred to above as the instruction file, such as the instruction file 60). YAML format is used which is easy to read and edit by humans but still machine parseable.

Note: By convention the image.yaml file name is used for the image descriptor.

Below are descriptions of image descriptor sections. This explains the valid instruction keywords.

1.2.1 Artifacts

External artifacts are often needed for a container. In most cases you will want to add files into the image and use them at the image build process.

Artifacts section is meant for this. Concreate will automatically fetch any artifacts specified in this section and check their consistency by computing the checksum of the downloaded file and comparing it with the desired value. The output name for downloaded resources will match the name attribute, which defaults to the base name of the file/URL. Artifact locations may be specified as urls, paths or git references.

```
artifacts:
    # File will be downloaded and verified.
    - name: jolokia-1.3.6-bin.tar.gz
      url:   https://github.com/rhuss/jolokia/releases/download/v1.3.6/
      jolokia-1.3.6-
      ↪bin.tar.gz
      md5:75e5b5ba0b804cd9def9f20a70af649f
    # File exists on local machine relative to this file. Checksum will be
    verified.
    # The "name" attribute defaults to: "hawkular-javaagent-1.0.0.CR4-
    redhat-1-
    ↪shaded.jar"
    - path: local-artifacts/hawkular-javaagent-1.0.0.CR4-redhat-1-shaded.jar
      md5:e133776c76a474ed46ac88c856eabe34
        # git project will be cloned
        # "name" attribute defaults to "project"
    - git:
        url: https://github.com/organization/project
        ref: master
```

Note:
Currently supported algorithms are: MD5, SHA1 and SHA256.

For artifacts that are not publicly available Concreate provides a way to add a description detailing a location from which the artifact can be obtained.

```
artifacts:
    - path: jboss-eap-6.4.0.zip
      md5: 9a5d37631919a111ddf42ceda1a9f0b5
      description: "Red Hat JBoss EAP 6.4.0 distribution
      available on Customer
      ↪Portal: https://access.redhat.com/jbossnetwork/restricted/
      softwareDetail.html?
        ↪softwareId=37393&product=appplatform&version=
        6.4&downloadType=distributions"
```

If Concreate is not able to download an artifact and this artifact has a description defined—the build will fail but a message with the description will be printed together with information on where to place the manually downloaded artifact.

1.2.2 Description

Short Summary of the Image.

Value of the description key is added to the image as two labels: description and summary unless such labels are already defined in the image descriptor's labels section.

```
description: "Red Hat JBoss Enterprise Application 7.0 - An application
platform
    ↪for hosting your apps that provides an innovative modular,
cloud-ready
    ↪architecture, powerful management and automation, and world class
    ↪developer productivity."
```

1.2.3 Envs

Similar to labels—we can specify environment variables that should be present in the container after running the image. We provide envs section for this.

Environment variables can be divided into two types:
1. Information environment variables—these are set and available in the image. This type of environment variables provide information to the image consumer. In most cases such environment variables should not be modified.
2. Configuration environment variables—this type of variables are used to define environment variables used to configure services inside running container.

These environment variables are not set during image build time but can be set at run time.

Every configuration environment variable should provide an example usage (example) and short description (description). Please note that you could have an environment variable with both: a value and example set. This suggests that this environment variable could be redefined.

Note: Configuration environment variables (without value) are not generated to the build source. These can be used instead as a source for generating documentation.

```
envs:
    .. name: "STI_BUILDER"
       value: "jee"
    .. name:"JBOSS_MODULES_SYSTEM_PKGS"
       value:"org.jboss.logmanager,jdk.nashorn.api"
    .. name:"OPENSHIFT_KUBE_PING_NAMESPACE"
       example: "myproject"
       description: "Clustering project namespace."
    .. name:"OPENSHIFT_KUBE_PING_LABELS"
       example: "application=eap-app"
       description: "Clustering labels selector."
```

1.2.4 from

This key is required.
Base image of your image.
    from: "jboss-eap-7-tech-preview/eap70:1.2"

1.2.5 labels

Note: Learn more about standard labels in container images.
Every image can include labels. Concreate makes it easy to do so with the labels section.

```
labels:
    .. name: "io.k8s.description"
       value: "Platform for building and running JavaEE apps on
       JBoss EAP 7.0"
    ... name: "io.k8s.display-name"
        value: "JBoss EAP 7.0"
```

1.2.6 Modules

Module Repositories

Module repositories specify location of modules that are to be incorporated into the image. These repositories may be git repositories or directories on the local file system (path). Concreate will scan the repositories for module.xml files, which are used to encapsulate image details that may be incorporated into multiple images.

```
modules:
    repositories:
        # Modules pulled from Java image project on GitHub
        - git:
            url:   https://github.com/jboss-container-images/
              redhat-openjdk-18-
    ↳openshift-image
            ref: 1.0
        # Modules pulled locally from "custom-modules"
          directory, collocated with
    ↳image descriptor
        - path: custom-modules
```

Module Installation

The install section is used to define what modules should be installed in the image in what order. Name used to specify the module is the name field from the module descriptor.

```
modules:
    install:
        .. name: xpaas.java
        .. name: xpaas.amq.install
```

You can even request specific module version via version key as follows:

```
modules:
    install:
        .. name: xpaas.java
           version: 1.2-dev
        ... name: xpaas.amq.install
```

1.2.7 Name
This key is required.
Image name without the registry part.
  name: "jboss-eap-7/eap70-openshift"
1.2.8 Packages
To install additional RPM packages you can use the packages section where you specify package names and repositories to be used.

```
packages:
    repositories:
        ... jboss-default
    install:
        .. mongodb24-mongo-java-driver
        .. postgresql-jdbc
        .. mysql-connector-java
        ... maven
        ... hostname
```

Packages are defined in the install subsection.

To be able to define private repositories that you want to use at build time we have the repositories subsection. You can define repository keys that should be enabled. In image descriptor you only define what to use. Actual definition for these repositories takes place in Concreate configuration file.

```
[repositories]
jboss-ocp=http://host/jboss-rhel-os.repo,http://host/jboss-rhel-
ocp.repo,http://host/
    ···→jboss-rhel-rhscl.repo
    other-repos=http://otherhost.com/osme.repo
```

Note:
Multiple url's can be separated with comma.

1.2.9 Ports

This section is used to mark which ports should be exposed in the container. If we want to highlight a port used in the container, but not necessary expose it—we should set the expose flag to false (true by default).

```
ports:
    .. value: 8443
    ... value: 8778
    ... expose: false
```

1.2.10 Run

The run section encapsulates instructions related to launching main process in the container including: cmd, entrypoint, user and workdir. All subsections are described later in this paragraph.

Below you can find full example that uses every possible option.

```
run:
    cmd:
        .. "argument1"
        .. "argument2"
    entrypoint:
        ... "/opt/eap/bin/wrapper.sh" user: "alice"
    workdir: "/home/jboss"
``` cmd

Command that should be executed by the container at run time.

```
run:
    cmd:
        .. "some cmd"
        ... "argument"
``` entrypoint

Entrypoint that should be executed by the container at run time.

```
run:
    entrypoint:
        -"/opt/eap/bin/wrapper.sh"
``` user

Specifies the user (can be username or uid) that should be used to launch the entrypoint process.

```
run:
    user: "alice"
``` workdir

Sets the current working directory of the entrypoint process in the container.

```
run:
    workdir: "/home/jboss"
```

1.2.11 Schema_Version

This key is required.

Here you specify the schema version of the descriptor. This influences what versions of Concreate are able to parse it.

schema_version: 1

1.2.12 Version

This key is required. Version of the image.

version: "1.4"

1.2.13 Volumes

In case you want to define volumes for your image, just use the volumes section.

```
volumes:
    - name: "volume.eap"
      path: "/opt/eap/standalone"
```

Note:
The name key is optional. If not specified the value of path key will be used.

1.3 Modules

Modules are an important concept in Concreate. It is suggested to make a module self-containing which means that executing scripts defined in the module's definition file should end up in a state where you could define the module as being installed. Modules can be stacked—some modules will be run before, some after you module. Please keep that in mind that at the time when you are developing a module—you don't know how and when it'll be executed.

1.3.1 Module Descriptor (Module Instruction Files)

Module and image descriptor share the same schema. Please refer to the image descriptor documentation for more information. Module descriptor extends image descriptor by adding the execute section (described below) and by making the version key optional.

execute

Execute section defines what needs to be done to install this module in the image. Every execution listed in this section will be run at image build time in the order as defined.

```
execute:
    # The install.sh file will be executed first as root user
    ... script: install.sh
    # Then the redefine.sh file will be executed as jboss user
    .. script: redefine.sh
        user: jboss
```

Note:
When no user is defined, root user will be used to execute the script.

1.3.2 Best practices

Storing Modules

We can find two most common use cases for storing modules:

1. Together with the image descriptor,
2. In external repository.

What fits the best for you depends on your project. If you are going to create a self-contained image then most probably you should be fine with local modules. In case you are developing image that requires a module potentially being useful for other images—you should develop that module independently of the image itself. External modules are all about reusing code across various images. In fact this was the initial idea for the whole project—make it easy to share code between images.

Local Modules

To make it easy to develop images quickly we added support for local modules, where the module source is stored together with the image descriptor. To use local module you need to reference it in repositories section in a following way:

```
modules:
    repositories:
        - path: modules
```

Script Parametrization

To parametrize your scripts you can use environment variables. Module installation should not require any parameters.

1.4 Configuration File

Concreate can be configured using a configuration file. We use the properties file format. Concreate will look for this file at the path ~/.concreate. Below you can find description of available sections together with options described in detail.

1.4.1 [common]

Ssl_Verify

Controls verification of SSL certificates for example when downloading artifacts. Default: True.

```
[common]
ssl_verify = False
``` cache_url

Specifies a different location that could be used to fetch artifacts. Usually this is a URL to some cache service. By default it is not set.

You can use following substitutions:

"#filename#"—the file name from the url of the artifact

"#algorithm#"—has algorithm specified for the selected artifact

"#hash#"—value of the digest.

Example

Consider you have an image definition with artifacts section like this:

```
artifacts:
    - url: "http://some.host.com/7.0.0/jboss-eap-7.0.0.zip"
      md5:cd02482daa0398bf5500e1628d28179a
```

If we set the cache_url parameter in following way:

```
[common]
cache_url = http://cache.host.com/fetch?#algorithm#=#hash#
```

The JBoss EAP artifact will be fetched from: http://cache.host.com/fetch?md5=cd02482daa0398bf5500e1628d28179a.

And if we do it like this:

```
[common]
cache_url = http://cache.host.com/cache/#filename#
```

The JBoss EAP artifact will be fetched from: http://cache.host.com/cache/jboss-eap-7.0.0.zip.

Note: In all cases digest will be computed from the downloaded file and compared with the expected value.

1.4.2 [repositories]

The repository section can be used to define YUM/DNF repository files that should be added to the image at build time.

```
[repositories]
jboss-ocp=http://host/jboss-rhel-os.repo,http://host/jboss-rhel-
 ↪ocp.repo,http://host/jboss-rhel-rhscl.repo
other-repos=http://otherhost.com/osme.repo
```

In case you have YUM/DNF repo files that you want to put to the /etc/yum.repos.d directory to enable additional repositories Concreate can handle it for you automatically. Repositories are defined using custom keys that could be later referenced in the image descriptor's packages section, under repositories.

```
packages:
    repositories:
        .. jboss-ocp
    install:
        .. mongodb24-mongo-java-driver
        .. postgresql-jdbc
        .. mysql-connector-java
        .. maven
        .. hostname
```

Concreate will copy all repo files to/etc/yum.repos.d directory and enable them to be used while installing packages listed in the packages section. At the end of the image build process Concreate removes newly added repo files from the/etc/yum.repos.d directory automatically. If you do not want to have these files removed after installation—you need to make your repo files part of some module that installs them in the correct place.

There are a few rules about repositories added that way:
1. This feature covers only the situation where you want to add a custom repo file at build time but you do not want it to be enabled in containers.
2. Repo file name should be the same as the repo id in the repository (the name between square brackets).
3. There should be only one repository per file.

Only added repositories will be enabled during install of packages, all other repositories (including default) will be disabled.

1.5 Building Image

Concreate supports following builder engines:
  Docker—build the container image using docker build command and it default option
  OSBS—build the container image using OSBS service

1.5.1 Executing Builds

You can execute an container image build by running:
  $ concreate build
  Options affecting builder:
  --tag—an image tag used to build image (can be specified multiple times)
  --build-engine—a builder engine to use osbs or docker(1)
  --build-osbs-release(2)—perform a OSBS release build
  --build-tech-preview2—updates image descriptor name key to contain—tech-preview suffix in family part of the image name
Example: If your name in image descriptor is: jboss-eap-7/eap7, generated name will be: jboss-eap-7-tech-preview/eap7.

1 docker build engine is default
2 option is valid on for osbs build engine

Docker Build
This is the default way to build an container image. The image is build using docker build.
Example: Building a Docker Image
  $ concreate build
  OSBS build
This build is using rhpkg container-build to build the image using OSBS service. By default it performs scratch build. If you need a release build you need to specify --build-osbs-release parameter.
Example: Performing scratch build
  $ concreate build --build-engine=osbs
Example: Performing release build
  $ concreate build --build-engine=osbs --build-osbs-release

1.6 Overrides

During an image life cycle there can be a need to do a slightly tweaked builds —using different base images, injecting newer libraries etc. We want to support such scenarios without a need of duplicating whole image sources. To achieve this Concreate supports overrides mechanism for its image descriptor. You can override almost anything in image descriptor. The overrides are based on overrides descriptor —a yaml file containing changes to image descriptor.

To use an override descriptor you need to pass --overrides <PATH> argument to a concreate.
Example: To use overrides.yaml file located in current working directory run:
  $ concreate build --overrides=overrides.yaml

1.6.1 how Overrides Works

Concreate is using YAML format for its descriptors. Overrides in concreate works on YAML node level.

Scalar Nodes

Scalar nodes are easy to override, if Concreate finds any scalar node in an overrides descriptor it updates its value in image descriptor with the overridden one.
Example: Overriding scalar node:
Image Descriptor

```
schema_version: 1
name: "dummy/example"
version: "0.1"
from: "busybox:latest"
```

Overrides Descriptor
  schema_version: 1 from: "fedora:latest"
Overridden Image Descriptor

```
schema_version: 1
name: "dummy/example"
version: "0.1"
from: "fedora:latest"
```

Sequence Nodes

Sequence nodes are little bit tricky, if they're representing plain arrays, we cannot easily override any value so Concreate is just merging arrays from image and override descriptors together.
Example: Overriding plain array node:
Image Descriptor

```
schema_version: 1
name: "dummy/example"
```

-continued

```
            version: "0.1"
            from: "busybox:latest"
            run:
               cmd:
               .. "echo"
               .. "foo"
```

Overrides Descriptor

```
            schema_version: 1
            run:
               cmd:
               - "bar"
```

Overridden Image Descriptor

```
            schema_version: 1
            name: "dummy/example"
            version: "0.1"
            from: "busybox:latest"
            run:
               cmd:
               .. "bar"
               .. "echo"
               .. "foo"
```

Known issues: Merging sequence nodes can have surprising results, please see corresponding issue.
  Mapping Nodes
Mappings are merged via name key. If Concreate is overriding a mapping or array of mappings it tries to find a name key in mapping and use and identification of mapping. If two name keys matches, all keys of the mapping are updated.
Example: Updating mapping node:
Image Descriptor

```
            schema_version: 1
            name: "dummy/example"
            version: "0.1"
            from: "busybox:latest"
            envs:
            - name: "FOO"
              value: "BAR"
```

Overrides Descriptor

```
            schema_version: 1
            envs:
            - name: "FOO"
              value: "new value"
```

Overridden Image Descriptor

```
            schema_version: 1
            name: "dummy/example"
            version: "0.1"
            from: "busybox:latest"
            envs:
            -  name: "FOO"
               value: "new value"
```

1.7 Developing Modules Locally

Concreate enables you to use a work in progress modules to build the image by exploiting its overrides system. As an example, imagine we have very simple image which is using one module from a cct_module repository like this:

```
         schema_version: 1
         name: "dummy/example"
         version: "0.1"
         from: "jboss/openjdk18-rhel7:1.1"
         modules:
            repositories:
               .. git:
                  url:https://github.com/jboss-openshift/cct_module.git
                  ref: master
            install:
               .. name: s2i-common
```

Now imagine, we have found a bug in its s2i-common module. We will clone the module repository localy by executing:
  1. Clone cct_module to your workstation to ~/repo/cct_module

```
         $ git clone https://github.com/jboss-openshift/cct_module.git
         ↪ /home/user/repo/cct_module
```

2. Then we will create override.yaml next to the image.yaml, override.yaml should look like:

```
         schema_version: 1
         modules:
            repositories:
            - path: "/home/user/repo/cct_module"
```

3. We now can build the image using overridden module by executing:
  $ concreate generate --overrides overrides.yaml
  4. When your work is finished, commit and push your changes to a module repository and remove overrides.yaml
1.8 Testing Image
Concreate is able to run behave based test for the image. We suggest to read behave documentation before reading this chapter.
Image can be Tested by Running:
  $ concreate test
Test options
  --test-wip—run only tests tagged with @wip tag.
  1.8.2 About Tests
Behave tests are separate to two parts steps and features. You can place tests in tests directory next to the image descriptor, module descriptor or in a root of a git repository which contains the modules. The tests directory is structured in following way:

```
               tests/features
               tests/features/amq.features
               tests/steps
               tests/steps/custom_steps.py
```

The tests/features directory is the place where you can drop your custom developed behave features. The tests/steps directory is optional and contains custom steps for specific image/module. We strongly recommend that a test is written for every feature that is added to the image. For the list of steps that are available for use in tests, see the steps repository. Where necessary we encourage people to add or extend the steps.

Tags

Concreate is selecting which test to run via tags mechanism. There are two way the tags are used:

1. Product Tags

These tags are based on product names. When a product image is tested, concreate uses tag containing image name and its product family name.

Example: If you are testing jboss-eap-7/eap7 image, test will be invoked with tag @jboss-eap-7 and @jboss-eap-7/eap7.

2. Wip tags

This is very special behavior used mainly in development, if you want to limit the test to be run to a subset you are working on. To achieve this you should mark your test scenario with @wip tag and run concreate test --test-wip.

Individuals will recognize improvements and modifications to the preferred examples of the disclosure. All such improvements and modifications are considered within the scope of the concepts disclosed herein and the claims that follow.

What is claimed is:

1. A method comprising:
reading, by a computing device comprising a processor device, a first instruction file that contains a first plurality of instruction keywords of a first programming language that complies with a first syntax, the first programming language comprising a plurality of different predetermined instruction keywords, at least some of the predetermined instruction keywords having corresponding one or more parameters, at least one of the first plurality of instruction keywords including a module instruction keyword and at least one parameter that identifies a shared location accessible by other computing devices;
parsing the first instruction file to detect particular keywords;
in response to detecting a presence of the module instruction keyword in the first instruction file, copying, by the computing device, a first plurality of files from the shared location identified in the first instruction file to a first consolidated location;
in response to detecting the presence of the particular keywords in the first instruction file, generating, by the computing device and utilizing a container builder syntax, a first container command file that references at least some of the first plurality of files on the first consolidated location, the first container command file including commands written in a second programming language that comply with the container builder syntax; and
initiating a container builder with parameters that cause the container builder to use the first container command file to generate a first container image that is configured to implement a first functionality.

2. The method of claim 1 wherein the container builder comprises a Docker container builder.

3. The method of claim 1 further comprising:
reading a second instruction file that contains a second plurality of instruction keywords;
based on the second plurality of instruction keywords, copying a second plurality of files from the shared location to a second consolidated location, at least one of the second plurality of files being a same file as one of the first plurality of files;
based on the second plurality of instruction keywords, generating a second container command file that references the second plurality of files; and
initiating the container builder to use the second container command file to generate a second container image that is configured to implement a second functionality that is different from the first functionality.

4. The method of claim 1 further comprising:
identifying a module instruction file in a module file, the module instruction file containing a second plurality of instruction keywords;
identifying in the second plurality of instruction keywords a script instruction keyword that identifies a script file comprising a plurality of commands; and
wherein generating the first container command file further comprises:
inserting in the first container command file an instruction that instructs the container builder to execute the script file during generation of the first container image.

5. The method of claim 1 further comprising:
identifying, in the first instruction file, a verification value associated with at least one of the first plurality of files;
running a verification algorithm against the one of the first plurality of files after the one of the first plurality of files is copied to generate a generated verification value; and
determining that the generated verification value and the verification value are identical.

6. The method of claim 1 further comprising:
identifying, in the first instruction file, a command instruction keyword that identifies a command to be provided to the first container image at run time of the first container image; and
inserting in the first container command file an instruction that instructs the container builder to generate the first container image such that the first container image is provided the command at the run time of the first container image.

7. The method of claim 1 wherein copying the first plurality of files from the shared location identified in the first instruction file to the first consolidated location comprises copying the first plurality of files from a plurality of different shared locations to the first consolidated location.

8. The method of claim 7 wherein at least one of the plurality of different shared locations comprises a public file repository.

9. A computing device, comprising:
a memory; and
a processor device coupled to the memory to:
read a first instruction file that contains a first plurality of instruction keywords, the first plurality of instructions comprising a first programming language that complies with a first syntax, the first programming language comprising a plurality of different predetermined instruction keywords, at least some of the predetermined instruction keywords having corresponding one or more parameters, at least one of the first plurality of instruction keywords including a module instruction keyword and at least one parameter that identifies a shared location accessible by other computing devices;
parse the first instruction file to detect particular keywords;
in response to detecting a presence of the module instruction keyword in the first instruction file, copy a first plurality of files from the shared location identified in the first instruction file to a first consolidated location;

in response to detecting the presence of the particular keywords in the first instruction file, generate, utilizing a container builder syntax, a first container command file that references at least some of the first plurality of files on the first consolidated location, the first container command file including commands written in a second programming language that comply with the container builder syntax; and initiate a container builder with parameters that cause the container builder to use the first container command file to generate a first container image that is configured to implement a first functionality.

10. The computing device of claim 9 wherein the processor device is further to:

read a second instruction file that contains a second plurality of instructions, the second plurality of instructions complying with the first syntax, at least one of the second plurality of instructions including an instruction keyword and at least one parameter that identifies the shared location accessible by other computing devices;

based on the at least one of the second plurality of instructions, copy a second plurality of files from the shared location to a second consolidated location, at least one of the second plurality of files being a same file as one of the first plurality of files;

based on the at least one of the second plurality of instructions, generate a second container command file that references the second plurality of files; and initiate the container builder to use the second container command file to generate a second container image that is configured to implement a second functionality that is different from the first functionality, the second container command file including commands that comply with the container builder syntax, the second container command file configured to generate a second container image that includes at least some of the second plurality of files.

11. The computing device of claim 9 wherein the module instruction keyword identifies a first module stored in the shared location, and wherein to copy the first plurality of files from the shared location identified in the first instruction file to the first consolidated location, the processor device is further to:

copy one or more module files in the first module from the shared location identified in the first instruction file to the first consolidated location;

identify a module instruction file in the one or more module files, the module instruction file containing a second plurality of instruction keywords;

identify in the module instruction file a module keyword that identifies a second module stored in the shared location; and copy one or more module files in the second module from the shared location identified in the first instruction file to the first consolidated location.

12. A computer program product stored on a non-transitory computer-readable storage medium and including instructions to cause a processor device to:

read a first instruction file that contains a first plurality of instruction keywords, the first plurality of instruction keywords of a first programming language that complies with a first syntax, the first programming language comprising a plurality of different predetermined instruction keywords, at least some of the predetermined instruction keywords having corresponding one or more parameters, at least one of the first plurality of instruction keywords including a module instruction keyword and at least one parameter that identifies a shared location accessible by other computing devices;

parse the first instruction file to detect particular keywords;

in response to detecting a presence of the module instruction keyword in the first instruction file, copy a first plurality of files from a shared location identified in the first instruction file to a first consolidated location;

in response to detecting the presence of the particular keywords in the first instruction file, generate, utilizing a container builder syntax, a first container command file that references at least some of the first plurality of files on the first consolidated location, the first container command file including commands written in a second programing language that comply with the container builder syntax; and initiate a container builder with parameters that cause the container builder to use the first container command file to generate a first container image that is configured to implement a first functionality.

13. The computer program product claim 12 wherein the instructions further cause the processor device to:

read a second instruction file that contains a second plurality of instruction keywords;

based on the second plurality of instruction keywords, copy a second plurality of files from the shared location to a second consolidated location, at least one of the second plurality of files being a same file as one of the first plurality of files;

based on the second plurality of instruction keywords, generate a second container command file that references the second plurality of files; and initiate the container builder to use the second container command file to generate a second container image that is configured to implement a second functionality that is different from the first functionality.

14. The computer program product of claim 12 wherein to copy the first plurality of files from the shared location identified in the first instruction file to the first consolidated location, the instructions further cause the processor device to:

identify in the first instruction file a module instruction keyword that identifies a first module stored in the shared location;

copy one or more module files in the first module from the shared location identified in the first instruction file to the first consolidated location;

identify a module instruction file in the one or more module files, the module instruction file containing a second plurality of instruction keywords;

identify in the module instruction file a module keyword that identifies a second module stored in the shared location; and copy one or more module files in the second module from the shared location identified in the first instruction file to the first consolidated location.

* * * * *